(12) United States Patent
Zhang

(10) Patent No.: US 11,317,089 B2
(45) Date of Patent: Apr. 26, 2022

(54) METHOD, APPARATUS, AND STORAGE MEDIUM FOR DIVIDING CODING UNIT OF VIDEO FRAME

(71) Applicant: TENCENT TECHNOLOGY (SHENZHEN) COMPANY LIMITED, Shenzhen (CN)

(72) Inventor: Hongshun Zhang, Shenzhen (CN)

(73) Assignee: Tencent Technologies (Shenzhen) Company Limited, Guangdong (CN)

(*) Notice: Subject to any disclaimer, the term of this patent is extended or adjusted under 35 U.S.C. 154(b) by 0 days.

(21) Appl. No.: 16/933,455

(22) Filed: Jul. 20, 2020

(65) Prior Publication Data

US 2020/0351498 A1 Nov. 5, 2020

Related U.S. Application Data

(63) Continuation of application No. PCT/CN2019/081211, filed on Apr. 3, 2019.

(30) Foreign Application Priority Data

May 10, 2018 (CN) .......................... 201810444914.5

(51) Int. Cl.
*H04N 19/119* (2014.01)
*H04N 19/105* (2014.01)
*H04N 19/147* (2014.01)
*H04N 19/172* (2014.01)

(52) U.S. Cl.
CPC ......... *H04N 19/119* (2014.11); *H04N 19/105* (2014.11); *H04N 19/147* (2014.11); *H04N 19/172* (2014.11)

(58) Field of Classification Search
CPC .. H04N 19/119; H04N 19/105; H04N 19/147; H04N 19/172; H04N 19/176; H04N 19/159
See application file for complete search history.

(56) References Cited

U.S. PATENT DOCUMENTS

| 2012/0236944 A1 | 9/2012 | Lee et al. |
| 2015/0271510 A1* | 9/2015 | Wen ...................... H04N 19/176 375/240.02 |

(Continued)

FOREIGN PATENT DOCUMENTS

| CN | 104023234 A | 9/2014 |
| CN | 104243997 A | 12/2014 |
| CN | 107295336 A | 10/2017 |
| CN | 107396121 A | 11/2017 |

OTHER PUBLICATIONS

Vivienne (High Efficiency Video Coding (HEVC) by Vivienne Sze, Madhukar Budagavi Gary J. Sullivan published in 2014. ISSN 1558-9412 ISBN 978-3-319-06894-7 ISBN 978-3-319-06895-4 (eBook) DOI 10.1007/978-3-319-06895-4) (Year: 2014).*

(Continued)

*Primary Examiner* — Nasim N Nirjhar
(74) *Attorney, Agent, or Firm* — Crowell & Moring LLP

(57) ABSTRACT

The present disclosure describes a method, an apparatus, and a storage medium for dividing a coding unit of a video frame. The method includes determining, by a device, according to a correspondence relationship between a frame type and a coding unit type, a target coding unit type based on a target frame type of a target frame, the target coding unit type indicating a division depth for dividing the target frame. The method further includes determining, by the device, according to coding unit information of a target coding unit during dividing the target coding unit with the target coding unit type in the target frame, whether the target coding unit meets a target condition, to obtain a target result; and performing, by the device, a division operation corresponding to the target result on the target coding unit.

15 Claims, 6 Drawing Sheets

(56) References Cited

U.S. PATENT DOCUMENTS

| 2016/0014434 A1* | 1/2016 | Liu | H04N 19/96 |
| | | | 375/240.12 |
| 2016/0021397 A1* | 1/2016 | Stepin | H04N 19/65 |
| | | | 375/240.12 |
| 2017/0094286 A1* | 3/2017 | Gu | H04N 19/15 |

OTHER PUBLICATIONS

International Search Report with English translation and Written Opinion regarding PCT/CN2019/081211 dated Jun. 19, 2019, 8 pages.
Extended European Search Report regarding EP19799390 dated May 12, 2021, 11 pages.
Choi et al., "Coding tree pruning based CU early termination," JCT-VC Meeting, Retrieved from the Internet: http://phenix.int-evry.fr/jct/doc_end_user/documents/6_Torino/wgil/JCTVC-FO92-v3.zip Jul. 15, 2011, 4 pgs.
Tan et al., "CU depth pruning for fast coding tree block decision." JCT-VC Meeting, Retrieved from the Internet: http://phenix.int-evry.fr./jct/doc_end_user/documents/7_Geneva/wgl11/JCTVC-G156-v2.zip, Nov. 21, 2011, 4 pgs.
Office Action for JP 2020-543747 dated Oct. 11, 2021, 5p. in Japanese language.
English language summary of Office Action for JP 2020-543747 dated Oct. 11, 2021, 2p.
Concise Explanation of Relevance for C1.

* cited by examiner

METHOD, APPARATUS, AND STORAGE MEDIUM FOR DIVIDING CODING UNIT OF VIDEO FRAME

RELATED APPLICATION

This application is a continuation application of PCT Patent Application No. PCT/CN2019/081211, filed on Apr. 3, 2019, which claims priority to Chinese Patent Application No. 201810444914.5, filed with National Intellectual Property Administration, P.R. China on May 10, 2018, both of which are incorporated herein by reference in their entireties.

FIELD OF THE TECHNOLOGY

This application relates to the field of computers, and specifically, to a method and an apparatus for dividing a coding unit of a video frame, a storage medium, and an electronic device.

BACKGROUND OF THE DISCLOSURE

A video with high definition, a high frame rate, and a high compression rate is a development trend in the future. During video coding at a high compression rate, currently, a manner in which a current coding unit (CU) is divided into 4 sub-blocks from top to bottom layer by layer until the size of the CU is 8, and then layer-by-layer comparison is performed from bottom to top to select an optimal CU division mode is used, and the manner may cause a relatively low coding speed.

No effective solution for the foregoing problem has been provided at present.

SUMMARY

Embodiments of this application provide a method and an apparatus for dividing a coding unit of a video frame, a storage medium, and an electronic device, to resolve at least the technical problem of a relatively low frame coding speed in the related art.

The present disclosure describes a method for dividing a coding unit of a video frame. The method includes determining, by a device, according to a correspondence relationship between a frame type and a coding unit type, a target coding unit type based on a target frame type of a target frame, the target coding unit type indicating a division depth for dividing the target frame. The device includes a memory storing instructions and a processor in communication with the memory. The method further includes determining, by the device, according to coding unit information of a target coding unit during dividing the target coding unit with the target coding unit type in the target frame, whether the target coding unit meets a target condition, to obtain a target result; and performing, by the device, a division operation corresponding to the target result on the target coding unit.

The present disclosure describes an apparatus for dividing a coding unit of a video frame. The apparatus includes a memory storing instructions; and a processor in communication with the memory. When the processor executes the instructions, the processor is configured to cause the apparatus to determine, according to a correspondence relationship between a frame type and a coding unit type, a target coding unit type based on a target frame type of a target frame, the target coding unit type indicating a division depth for dividing the target frame, determine, according to coding unit information of a target coding unit during dividing the target coding unit with the target coding unit type in the target frame, whether the target coding unit meets a target condition, to obtain a target result, and perform a division operation corresponding to the target result on the target coding unit.

The present disclosure describes a non-transitory computer readable storage medium storing computer readable instructions. The computer readable instructions, when executed by a processor, are configured to cause the processor to perform determining, according to a correspondence relationship between a frame type and a coding unit type, a target coding unit type based on a target frame type of a target frame, the target coding unit type indicating a division depth for dividing the target frame; determining, according to coding unit information of a target coding unit during dividing the target coding unit with the target coding unit type in the target frame, whether the target coding unit meets a target condition, to obtain a target result; and performing a division operation corresponding to the target result on the target coding unit.

According to another aspect of the embodiments of this application, an electronic device is further provided, including a memory and a processor, the memory storing a computer program, and the processor being configured to perform the method in any one of the foregoing aspects by using the computer program.

According to another aspect of the embodiments of this application, a computer program product including an instruction is further provided, the computer program product, when run on a computer, causing the computer to perform the method for dividing a coding unit of a video frame according to this application.

In the embodiments of this application, error accumulation of CU depths is mainly caused by two aspects: One aspect is a frame type of a current frame. Because weights of which different types of frames are used as reference frames are different, diffusion degrees of error accumulation in different types of frames are also different. The other aspect is the size of a coding unit. Influencing ranges caused when coding units with different sizes are incorrectly divided are also different. Therefore, different frame types and CUs with different sizes are separately processed. Specifically, one embodiment of a method includes: determining, according to a frame type and a coding unit type that have a correspondence, a target coding unit type corresponding to a target frame type to which a target frame belongs, the target coding unit type being used for indicating a division depth for dividing the target frame, determining, according to coding unit information of a target coding unit in a case that the target coding unit belonging to the target coding unit type in the target frame is divided, whether the target coding unit meets a target condition, to obtain a target result, and then performing a division operation corresponding to the target result on the target coding unit. Therefore, different division manners can be adopted for different frame types, to avoid an operation of dividing each video frame to the lowest level, thereby improving a frame coding speed, and further resolving the technical problem of a relatively low frame coding speed in the related art. Further, different situations of dividing coding units in frames of different frame types are fully considered, and division depths are determined for the frames of different frame types, to avoid diffusion of error accumulation, thereby reducing coding errors.

BRIEF DESCRIPTION OF THE DRAWINGS

The accompanying drawings described herein are used for providing a further understanding of this application, and form a part of this application. Exemplary embodiments of this application and descriptions thereof are used for explaining this application, and do not constitute any inappropriate limitation to this application. In the accompanying drawings.

DESCRIPTION OF EMBODIMENTS

Figure 1:
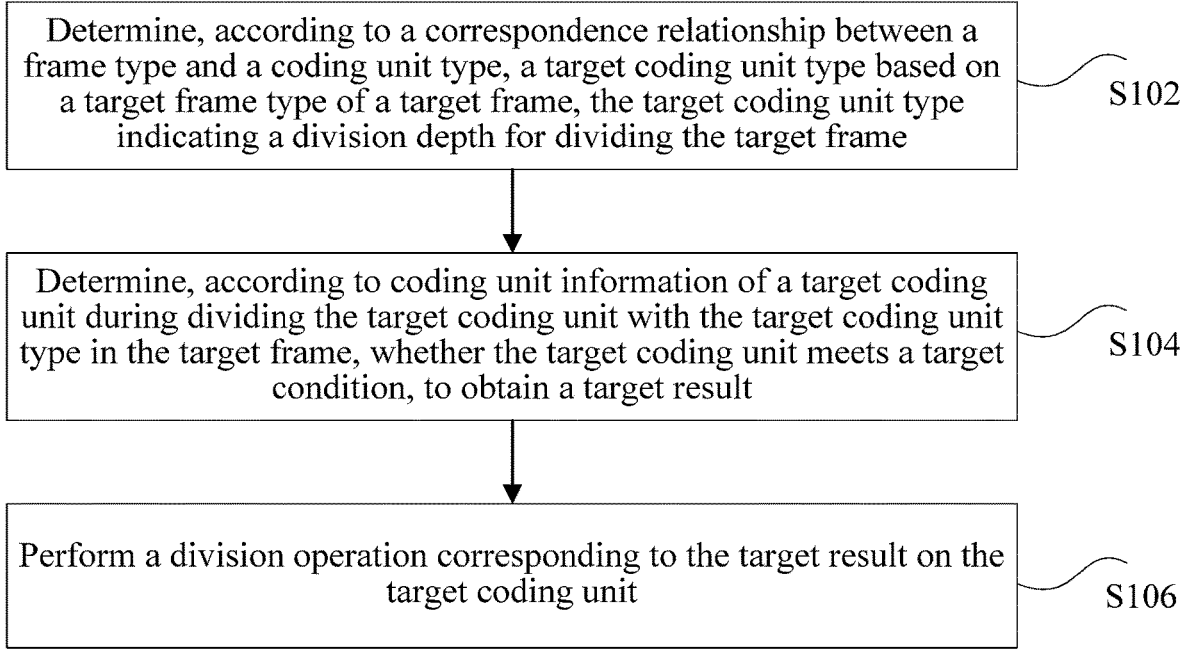
FIG. 1 is a schematic diagram of an optional method for dividing a coding unit of a video frame according to an embodiment of this application.

To make a person skilled in the art better understand solutions of the present disclosure, the following clearly and completely describes the technical solutions in the embodiments of the present disclosure with reference to the accompanying drawings in the embodiments of the present disclosure. Apparently, the described embodiments are some of the embodiments of the present disclosure rather than all of the embodiments. All other embodiments obtained by a person of ordinary skill in the art based on the embodiments of the present disclosure without creative efforts shall fall within the protection scope of the present disclosure.

In the specification, claims, and accompanying drawings of the present disclosure such as "first", "second", and the like are intended to distinguish between similar objects but do not necessarily indicate a specific order or sequence. It is to be understood that data used in this way is exchangeable in a proper case, so that the embodiments of the present disclosure described herein can be implemented in another order except those shown or described herein. Moreover, the terms "include", "contain" and any other variation mean to cover the non-exclusive inclusion. For example, a process, method, system, product, or device that includes a list of operations or units is not necessarily limited to those expressly listed steps or units, but may include other steps or units not expressly listed or inherent to such a process, method, system, product, or device.

Throughout the specification and claims, terms may have nuanced meanings suggested or implied in context beyond an explicitly stated meaning Likewise, the phrase "in one embodiment" or "in one implementation" as used herein does not necessarily refer to the same embodiment or implementation and the phrase "in another embodiment" or "in another implementation" as used herein does not necessarily refer to a different embodiment or implementation. It is intended, for example, that claimed subject matter includes combinations of exemplary embodiments or implementations in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context.

According to an aspect of the embodiments of this application, a method for dividing a coding unit of a video frame is provided. As shown in FIG. 1, the method includes:

S102. Determine, according to a correspondence relationship between a frame type and a coding unit type, a target coding unit type based on a target frame type of a target frame, the target coding unit type indicating a division depth for dividing the target frame.

S104. Determine, according to coding unit information of a target coding unit during dividing the target coding unit with the target coding unit type in the target frame, whether the target coding unit meets a target condition, to obtain a target result.

S106. Perform a division operation corresponding to the target result on the target coding unit.

Figure 2:
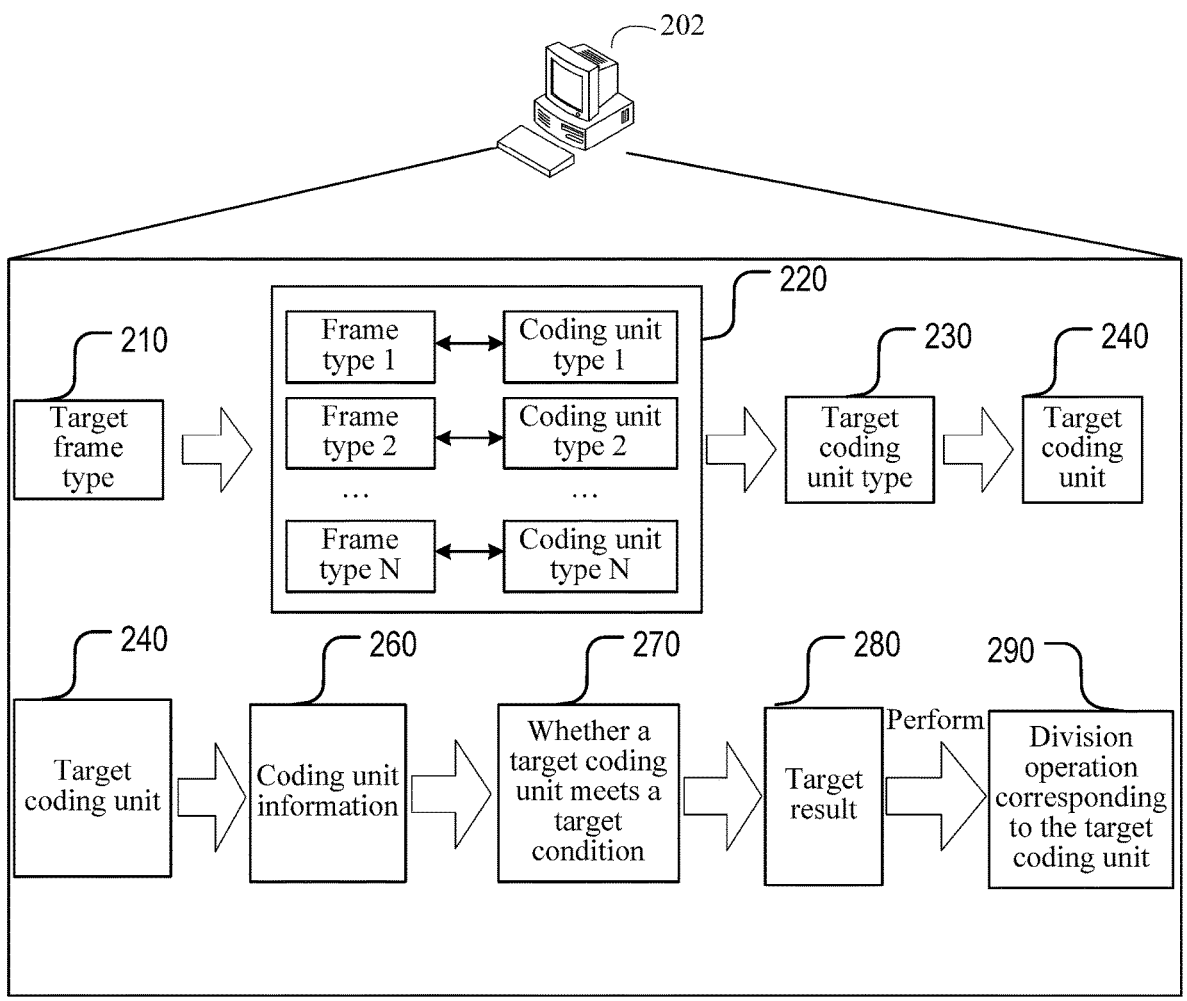
FIG. 2 is a schematic diagram of an application environment of an optional method for dividing a coding unit of a video frame according to an embodiment of this application.

Optionally, in this embodiment, the foregoing method for dividing a coding unit of a video frame may be applied to a hardware environment composed of a target device 202 as shown in FIG. 2. As shown in FIG. 2, the target device 202 is configured to determine, according to correspondence relationship between a list of frame types and a list of coding unit types (220), a target coding unit type (230) corresponding to a target frame type (210) to which a to-be-divided target frame belongs, the target coding unit type being used for indicating a division depth for dividing the target frame; determine, according to coding unit information (260) of a target coding unit (240) in a case that the target coding unit belonging to the target coding unit type in the target frame is divided, whether the target coding unit meets a target condition (270), to obtain a target result (280); and perform a division operation corresponding to the target result on the target coding unit (290).

Optionally, in this embodiment, the method for dividing a coding unit of a video frame may be applied to, but not limited to, a scenario of dividing a coding unit for a frame. The method for dividing a coding unit of a video frame may be applied to, but not limited to, various types of clients in which video coding can be performed. For example, the clients may include, but are not limited to: an online education application, an instant messaging client, a community space client, a game client, a shopping client, a browser client, a financial client, a multimedia client, and a video on-live client. Specifically, the method may be applied to, but not limited to, a scenario of dividing coding units for frames in a video resource when video coding is performed in the multimedia client, or may be further applied to, but not limited to, a scenario of dividing coding units for frames in a video resource when video coding is performed in the game client, to improve a frame coding speed. The foregoing description is merely an example, and no limitation is imposed in this embodiment.

Optionally, in this embodiment, the method for dividing a coding unit of a video frame may be applied to a client side, or a server side, or may be performed through interaction between the client side and the server side.

Figure 3:
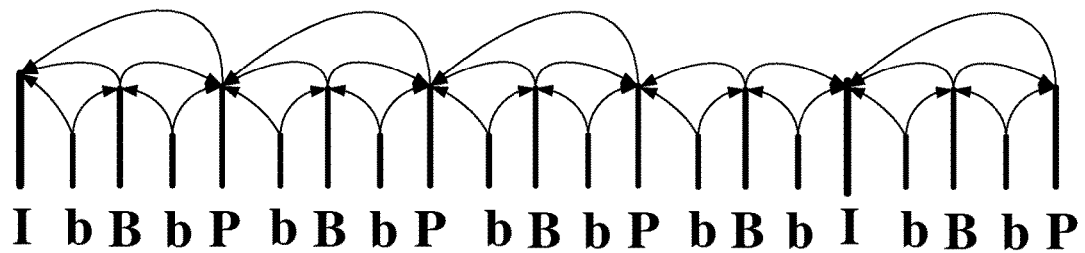
FIG. 3 is a schematic diagram of an optional method for dividing a coding unit of a video frame according to an optional implementation of this application.

Optionally, in this embodiment, the frame type may be divided according to a reference relationship between frames in a frame coding process, or in other manners. For example, as shown in FIG. 3, the frame type includes: an I frame, a P frame, a B frame, and a b frame. The I frame is an intra-coded frame, which may be understood as that the frame of image is completely reserved, and only data of a current frame is required to complete decoding. The P frame is a forward predictive coded frame, which identifies a difference between a previous key frame and a current frame, and during decoding, a previously cached image and a difference defined by the current frame are required to generate a final image. In other words, there is no complete image data in the P frame. Specifically, there is difference data between images of the previous key frame and the current frame. The B frame is a bidirectional predictive interpolative coded frame. The B frame records a difference between a current frame and a previous frame, and a difference between the current frame and a next frame, and has a relatively high compression rate. During decoding, a cached image before the current frame is required, and an image after the current frame is also required to be decoded. Therefore, a final image is obtained by combining previous and next images and data of the current frame. For a P frame, reference is made to an I frame; for a B frame, reference is made to the P frame or the I frame; for a b frame, reference is made to the I frame, the P frame, or the B frame; the b frame is not used as a reference frame. Frames to which arrows in FIG. 3 point are reference frames.

Figure 4:
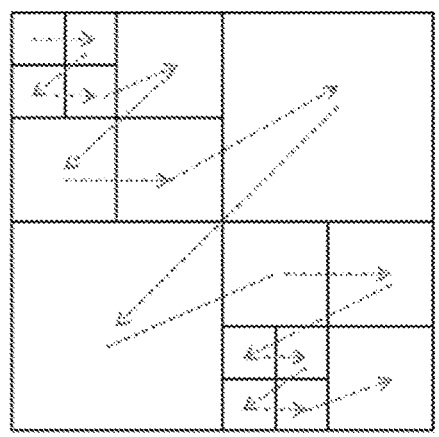
FIG. 4 is a schematic diagram of another optional method for dividing a coding unit of a video frame according to an optional implementation of this application.
Figure 4:
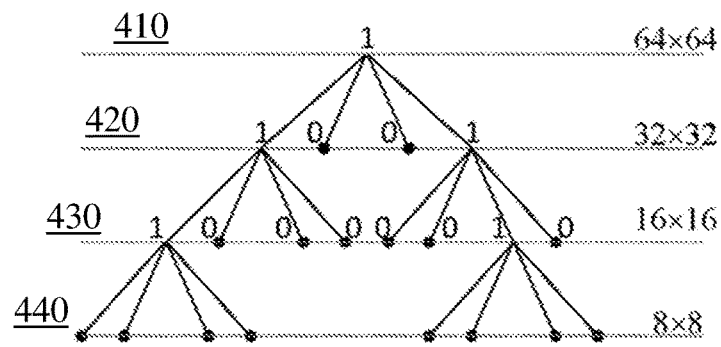

Optionally, in this embodiment, the division depth may be determined according to the size of a coding unit. For example, when intra-frame prediction or inter-frame prediction is performed in a video coding process, as shown in FIG. 4, a recursive operation is performed downward layer by layer, and in each layer, a largest coding unit (LCU) is first divided according to a quad-tree. For each coding tree unit (CTU), a recursive process of a total of three levels, namely, division from CU64×64 (410) to CU32×32 (420), division from CU32×32 (420) to CU16×16 (430), and division from CU16×16 (430) to CU8×8 (440), is performed.

The size of a coding unit is represented by 2N×2N. For example, 64×64, 32×32, 16×16, and 8×8 indicate sizes of coding units. A division depth of a coding unit having a 64×64 size is 0, a CU division depth of a coding unit having a 32×32 size is 1, a CU division depth of a coding unit having a 16×16 size is 2, and a CU division depth of a coding unit having an 8×8 size is 3.

Division of a coding unit may be further represented by using a dividing layer. For example, division from a 64×64 coding unit to 32×32 coding units is the $0^{th}$ layer, division from the 32×32 coding units to 16×16 coding units is the first layer, and division from the 16×16 coding units to 8×8 coding units is the second layer.

Ranks of division depths may be determined based on values of the division depths. A smaller value of a division depth indicates a higher rank. For example, a division depth of a coding unit having a 64×64 size is less than a division depth of a coding unit having a 32×32 size. Therefore, a rank of the division depth of the coding unit having a 64×64 size is higher than a rank of the division depth of the coding unit having a 32×32 size. Similarly, the rank of the division depth of the coding unit having a 32×32 size is higher than a rank of a division depth of a coding unit having a 16×16 size, and the rank of the division depth of the coding unit having a 16×16 size is higher than a rank of a division depth of a coding unit having an 8×8 size.

Optionally, in this embodiment, a corresponding coding unit type may be configured for each frame type. For example, error accumulation is diffused within an I-frame period. For a P frame, reference is made to an I frame; for a B frame, reference is made to the P frame or the I frame; for a b frame, reference is made to the I frame, the P frame, or the B frame; the b frame is not used as a reference frame. Weights of the 4 frame types are ranked in descending order as follows: I frame>P frame>B frame>b frame. In addition, once an error occurs during division from a largest 64×64 CU to 32×32 CUs, subsequent division from 4 32×32 CUs to 16×16 CUs and division from 16 16×16 CUs to 8×8 CUs are not performed. Similarly, once an error occurs during division from a 32×32 CU to 16×16 CUs, subsequent division from 4 16×16 CUs to 8×8 CUs is not performed. However, once an error occurs during division from a 16×16 CU to 8×8 CUs, only the division from a 16×16 CU to 8×8 CUs is affected. Therefore, influencing weights of CUs with different sizes are ranked in descending order as follows: CU64×64>CU32×32>CU16×16.

Due to the foregoing two characteristics, division depths with different weights may be allocated for frame types with different weights by using the following manner: for the I frame, because once an error occurs in the I frame, all frames behind the I frame are affected, division from CU64×64 to CU8×8 is performed on all CU blocks in the I frame, and it is set that the I frame corresponds to no coding unit type, or it is set that a division depth indicated by a coding unit type corresponding to the I frame is lower than 0 or higher than 3; for the P frame, because a weight of the P frame is second only to that of the I frame, and there are a plurality of impacts, it is set that a division depth indicated by a coding unit type corresponding to the P frame is 2; for the B frame, because an influencing range of the B frame is only within a P-frame period, it is set that division depths indicated by a coding unit type corresponding to the B frame are 1 and 2; for the b frame, because other frames are not affected by an error, it is set that division depths indicated by a coding unit type corresponding to the b frame is 0, 1, and 2.

Optionally, in this embodiment, a division manner of a coding unit that does not belong to the target coding unit type in the target frame may be, but is not limited to, a division manner in the related art. For example, all coding units in an I frame are divided in the division manner in the related art, that is, a total of three levels of division, that is, division from CU64×64 to CU32×32, division from CU32×32 to CU16×16, and division from CU16×16 to CU8×8 is performed. In a process of dividing coding units in a P frame, quick depth division is performed on a coding unit of which the depth is 2. Coding units of which depths are 0 and 1 are divided by using the division manner in the related art. That is, division from CU64×64 to CU32×32, and division from CU32×32 to CU16×16 are performed by using the related art, and then whether a 16×16 CU meets a quick division condition is determined. If yes, division of the 16×16 CU is stopped, and if not, the 16×16 CU is further divided into 8×8 CUs. In a process of dividing coding units in a B frame, quick depth division is performed on coding units of which depths are 1 and 2. A coding unit of which the depth is 0 is divided by using the division manner in the related art. That is, division from CU64×64 to CU32×32 is performed by using the related art, and then whether a 32×32 CU meets a quick division condition is determined. If yes, division of the 32×32 CU is stopped, and if not, the 32×32 CU is further divided into 16×16 CUs. Then, whether the 16×16 CUs meet the quick division condition is determined. If yes, division of the 16×16 CUs is stopped, and if not, the 16×16 CUs are further divided into 8×8 CUs. In a process of dividing coding units in a b frame, quick depth division is performed on coding units of which depths are 0, 1, and 2. In other words, all division processes are quick depth division. Whether a 64×64 CU meets a quick division condition is determined. If yes, division of the 64×64 CU is stopped, and if not, the 64×64 CU is further divided into 32×32 CUs. Then, whether the 32×32 CUs meet the quick division condition is determined. If yes, division of the 32×32 CUs is stopped, and if not, the 32×32 CUs are further divided into 16×16 CUs. Finally, whether the 16×16 CUs meet the quick division condition is determined. If yes, division of the 16×16 CUs is stopped, and if not, the 16×16 CUs are further divided into 8×8 CUs.

Optionally, in this embodiment, the coding unit information of the target coding unit may include, but is not limited to: an optimal mode of the target coding unit and a rate-distortion cost of the optimal mode of the target coding unit.

Optionally, in this embodiment, the target condition may include, but is not limited to, that the optimal mode of the target coding unit is a skip mode, and the rate-distortion cost of the optimal mode of the target coding unit falls within a target threshold range.

It can be learned that, by using the foregoing steps, in a process of dividing coding units of a frame, whether to quickly determine a division depth of a coding unit is determined according to a correspondence between a frame type and a coding unit type, when a coding unit belonging to a coding unit type recorded in the correspondence is divided, whether to stop division of the coding unit is determined according to coding unit information of the coding unit, and a subsequent division operation is performed according to an obtained target result. Therefore, different division manners may be adopted for different frame types when division is performed in different division depths, to avoid an operation of dividing each video frame to the lowest level, thereby improving a frame coding speed, and further resolving the technical problem of a relatively low frame coding speed in the related art. Further, different situations of dividing coding units in frames of different frame types are fully considered, and division depths indicating whether division is further performed are determined for the frames of different frame types, thereby reducing coding errors.

In an optional solution, the performing a division operation corresponding to the target result on the target coding unit includes:

S1. Stop division of the target coding unit in a case that the target result is used for indicating that the target coding unit meets the target condition; and/or S2. Divide the target coding unit in a case that the target result is used for indicating that the target coding unit does not meet the target condition.

Optionally, in this embodiment, in a case that the target coding unit meets the target condition, a division operation corresponding to the target result may include, but is not limited to, stopping division of the target coding unit.

Optionally, in this embodiment, in a case that the target coding unit does not meet the target condition, a division operation corresponding to the target result may include, but is not limited to, continuing to divide the target coding unit.

In an optional solution, before the determining, according to a frame type and a coding unit type that have a correspondence, a target coding unit type corresponding to a target frame type to which a target frame belongs, the frame type and the coding unit type that have a correspondence may be further established in the following manner, which specifically includes the following steps:

S1. Obtain the frame type, the frame type being obtained through division according to a reference relationship between frames in a frame coding process.

S2. Obtain the coding unit type corresponding to the frame type.

The coding unit type is used for indicating that a division depth is a first depth value when a frame belonging to the frame type is divided. Alternatively, the coding unit type is used for indicating a depth relationship between a second depth value and a target depth value when a frame belonging to the frame type is divided.

S3. Store the frame type and the coding unit type that have a correspondence. In one implementation, the correspondence relationship between the frame type and the coding unit type is stored in a memory of a device.

Optionally, in this embodiment, the coding unit type may be used for indicating one or more specific depth values (for example, 3, 2, 1, and 0), or may be used for indicating depth relationships (for example, lower than the highest depth value, lower than the highest depth value and higher than the lowest depth value, and only lower than the highest depth value).

In an optional implementation, for example, there are 4 types of depth values, which are respectively: 3, 2, 1, and 0. When the coding unit type is used for indicating that a division depth is a first depth value when a frame belonging to the frame type is divided, the frame type and the coding unit type that have a correspondence may be shown in Table 1.

TABLE 1

| Frame type | Coding unit type |
|---|---|
| I frame | None |
| P frame | 2 |
| B frame | 1 and 2 |
| b frame | 0, 1, and 2 |

Optionally, in this embodiment, a process of determining, according to coding unit information of a target coding unit in a case that the target coding unit belonging to the target coding unit type in the target frame is divided, whether the target coding unit meets a target condition, stopping division of the target coding unit in a case that the target coding unit meets the target condition, and/or dividing the target coding unit in a case that the target coding unit does not meet the target condition may be referred to as a process of quickly determining a coding unit depth. By configuring different coding unit types for different frame types, division depths entering a quick determining process are allocated for frames of different types according to a reference relationship between frames in a process of quickly determining a target coding unit depth, so that a coding speed can be greatly improved while ensuring coding accuracy.

In an optional solution, the obtaining the frame type includes:

S1. Determine the frame type, the frame type including: a first frame type, a second frame type, a third frame type, and a fourth frame type, where a frame of the first frame type is a frame coded without reference to any other frame, a frame of the second frame type is a frame coded with reference to a frame belonging to the first frame type, a frame of the third frame type is a frame coded with reference to a frame belonging to the first frame type and a frame belonging to the second frame type, and a frame of the fourth frame type is a frame coded with reference to a frame belonging to the first frame type and a frame belonging to the third frame type, or coded with reference to a frame belonging to the second frame type and a frame belonging to the third frame type.

Optionally, in this embodiment, frames of the first frame type, the second frame type, the third frame type, and the fourth frame type may have, but not limited to, the following reference relationships: for a frame of the second frame type, reference is made to a frame of the first frame type; for a frame of the third frame type; reference is made to a frame of the first frame type and a frame of the second frame type; and for a frame of the fourth frame type, reference is made to a frame of the first frame type and a frame of the third frame type, or for a frame of the fourth frame type, reference is made to a frame of the second frame type and a frame of the third frame type.

For example, the frame of the first frame type may be an I frame, the frame of the second frame type may be a P frame, the frame of the third frame type may be a B frame, and the frame of the fourth frame type may be a b frame.

In an optional solution, the obtaining a coding unit type corresponding to the frame type includes:

S1. Determine that the first frame type does not have the coding unit type.

S2. Determine that a coding unit type corresponding to the second frame type is a first coding unit type, coding units belonging to the first coding unit type including: 16×16 coding units.

S3. Determine that a coding unit type corresponding to the third frame type is a second coding unit type, coding units belonging to the second coding unit type including: 16×16 coding units and 32×32 coding units.

S4. Determine that a coding unit type corresponding to the fourth frame type is a third coding unit type, coding units belonging to the third coding unit type including: 16×16 coding units, 32×32 coding units, and 64×64 coding units.

Optionally, in this embodiment, the first frame type may be an I frame. For the I frame, determining of quick division of a coding unit may not be performed. In other words, for the I frame, coding units of the I frame in all layers may be directly divided into the smallest coding units.

Optionally, in this embodiment, the second frame type may be a P frame. For the P frame, determining of quick division may be performed only on 16×16 coding units. In other words, for the P frame, a 64×64 coding unit in the P frame is divided into 32×32 coding units, and then the 32×32 coding units are divided into 16×16 coding units. Then, whether the 16×16 coding units meet a target condition is determined according to coding unit information of the 16×16 coding units. If yes, division is stopped. If no, the 16×16 coding units are further divided into 8×8 coding units.

Optionally, in this embodiment, the third frame type may be a B frame. For the B frame, determining of quick division may be performed on 32×32 coding units and 16×16 coding units. In other words, for the B frame, a 64×64 coding unit in the B frame is divided into 32×32 coding units, and then whether the 32×32 coding units meet a target condition is determined according to coding unit information of the 32×32 coding units. If yes, division is stopped. If no, the 32×32 coding units are further divided into 16×16 coding units. For the divided 16×16 coding units, whether the 16×16 coding units meet the target condition is determined according to coding unit information of the 16×16 coding units. If yes, division is stopped. If no, the 16×16 coding units are further divided into 8×8 coding units.

Optionally, in this embodiment, the fourth frame type may be a b frame. For the b frame, determining of quick division may be performed on a 64×64 coding unit, 32×32 coding units and 16×16 coding units. In other words, for the b frame, whether the 64×64 coding unit meets a target condition is determined according to coding unit information of the 64×64 coding unit. If yes, division is stopped. If no, the 64×64 coding unit is divided into 32×32 coding units. For the divided 32×32 coding units, whether the 32×32 coding units meet the target condition is determined according to coding unit information of the 32×32 coding units. If yes, division is stopped. If no, the 16×16 coding units are further divided into 16×16 coding units. For the divided 16×16 coding units, whether the 16×16 coding units meet the target condition is determined according to coding unit information of the 16×16 coding units. If yes, division is stopped. If no, the 16×16 coding units are further divided into 8×8 coding units.

In an optional solution, the coding unit type may be further used for indicating that a division depth is a first depth value when a frame belonging to the frame type is divided. In this case, the obtaining a coding unit type corresponding to the frame type includes:

S1. Determine that a coding unit type corresponding to the first frame type is a first coding unit type, where a first depth value indicated by the first coding unit type is a first target value, and the first target value may be set to null.

S2. Determine that a coding unit type corresponding to the second frame type is a second coding unit type, where a first depth value indicated by the second coding unit type is a second target value, the second target value is a depth value only lower than the highest depth value, and the highest depth value is a depth value of the smallest coding unit into which a frame may be divided.

S3. Determine that a coding unit type corresponding to the third frame type is a third coding unit type, where a first depth value indicated by the third coding unit type is a third target value, the third target value is a depth value lower than the highest depth value and higher than the lowest depth value, the highest depth value is a depth value of the smallest coding unit into which a frame may be divided, and the lowest depth value is a depth value of the largest coding unit into which a frame may be divided.

S4. Determine that a coding unit type corresponding to the fourth frame type is a fourth coding unit type, where a first depth value indicated by the fourth coding unit type is a fourth target value, the fourth target value is a depth value lower than the highest depth value, and the highest depth value is a depth value of the smallest coding unit into which a frame may be divided.

Optionally, in this embodiment, for a frame of the first frame type that is coded without reference to any other frame, because the frame of this type is a reference frame of frames of other types, the frame of this type has a higher key degree. Therefore, a corresponding coding unit type may not be set for the frame of the first frame type. Alternatively, a coding unit type corresponding to the frame is set to be used for indicating division depths that are not included in preset division depths. Therefore, the frame of this type is divided from the lowest depth to the highest depth without a process of quickly determining a coding unit depth during division of the coding unit.

Optionally, in this embodiment, because a frame of the second frame type uses only the frame of the first frame type as a reference frame, and both a frame of the third frame type and a frame of the fourth frame type may use the frame of the second frame type as reference frames, a key degree of the frame of the second frame type is second only to that of the frame of the first frame type. Therefore, for the frame of the second frame type, a process of quickly determining a coding unit depth may be performed only on a previous layer of the highest division depth. A depth value only lower than the highest depth value may be set as a depth value indicated by the second frame type. There is one depth value only lower than the highest depth value.

Optionally, in this embodiment, because a frame of the third frame type uses the frame of the first frame type and the frame of the second frame type as reference frames, and the frame of the third frame type is a reference frame of a frame of the fourth frame type, for the frame of the third frame type, a process of quickly determining a coding unit depth may be performed on layers between the highest division depth and the lowest division depth. A depth value lower than the highest depth value and higher than the lowest depth value may be set as a depth value indicated by the third frame type. There may be a plurality of depth values lower than the highest depth value and higher than the lowest depth value.

Optionally, in this embodiment, because a frame of the fourth frame type uses the frame of the first frame type and the frame of the third frame type as reference frames, or uses the frame of the second frame type and the frame of the third frame type as reference frames, and the frame of the fourth frame type is not used as a reference frame of frames of other frame types, for the frame of the fourth frame type, a process of quickly determining a coding unit depth may be performed from the highest division depth layer by layer. A depth value lower than the highest depth value may be set as a depth value indicated by the fourth frame type. There may be a plurality of depth values lower than the highest depth value.

In an optional solution, the determining, according to coding unit information of a target coding unit, whether the target coding unit meets a target condition includes:

S1. Determine a coding unit according with the division depth indicated by the target coding unit type in the target frame as the target coding unit.

S2. Obtain the coding unit information of the target coding unit in a case that the target coding unit is divided.

S3. Determine, according to the coding unit information, whether the target coding unit meets the target condition.

Optionally, in this embodiment, when a target frame is divided, a target coding unit belonging to a target coding unit type in the target frame may be obtained according to the determined target coding unit type corresponding to the target frame. When a division process is performed on the target coding unit, a process of quickly determining a coding unit depth is performed on the target coding unit, so that whether the target coding unit is further divided is determined according to obtained coding unit information.

Optionally, in this embodiment, the obtained coding unit information of the target coding unit may include, but is not limited to: an optimal mode of the target coding unit and a rate-distortion cost of the optimal mode.

Optionally, in this embodiment, the target condition may include, but is not limited to, that the optimal mode of the target coding unit is a skip mode, and the rate-distortion cost of the optimal mode of the target coding unit falls within a target threshold range.

Optionally, in this embodiment, simultaneously meeting the foregoing two target conditions may be determined as meeting the target condition. If one of the two is not met, that is, the optimal mode is not the skip mode or the rate-distortion cost does not fall within the target threshold range, it is determined that the target coding unit does not meet the target condition.

Optionally, in this embodiment, the target threshold range may be preset, or may be determined according to information obtained in the coding process.

For example, a quantity of available CTUs in adjacent locations (a left side, an upper side, an upper left corner, and an upper right corner) of a current CTU, a quantity of CUs that are in a skip mode and that have the same CU depth in adjacent CTUs, and an average of rate-distortion costs of the CUs are obtained through statistics, and are respectively denoted as ctu_validnum_skip_adjacent, samecudepth_num_skip_adjacent, and samecudepth_avgcost_skip_adjacent. Moreover, a quantity of processed CUs in the current CTU that are in the skip mode and that have the same depth and an average of rate-distortion costs of the CUs are obtained through statistics, and are respectively denoted as samecudepth_num_skip_curr and samecudepth_avgcost_skip_curr.

A rate-distortion cost of an optimal mode of a current CU is denoted as bestcost, and an initial check is set to false. If it is obtained that check is true through the following comparison, it is determined that the current CU meets the target condition.

```
check=false; //dividing a current CU into 4 sub-blocks is required by default
if(ctu_validnum_skip_adjacent>0) //adjacent CTUs are available
{
    //if there is no CU meeting a target condition in the current CTU, only an
average rate-distortion cost of CUs in the adjacent CTUs is obtained
    avgcost=samecudepth_avgcost_skip_adjacent;
    if(samecudepth_num_skip_curr>0) //the current CTU includes CUs with the
same CU depth and in a skip mode, and an average rate-distortion cost is obtained by performing
weighted summation on rate-distortion costs of CUs that have the same depth in the adjacent
CTUs and rate-distortion costs of the processed CUs in the current CTU that have the same depth
    {
        avgcost=(9*samecudepth_avgcost_skip_curr+samecudepth_avgcost_skip_adjacent)/16;
    }
```

```
    if(bestcost<=avgcost&&samecudepth_num_skip_adjacent>3.5*ctu_validnum_ski
p_adjacent)
    {
      check=true;
    }
  }
  else //all the adjacent CTUs are not available
  {
if(bestcost<=samecudepth_avgcost_skip_curr&&samecudepth_num_skip_curr>3.5) //compared
with an average of the rate-distortion costs of the processed CUs in the current CTU that have
the same depth and a quantity of the processed CUs
    {
      check=true;
    }
  }
```

For simple descriptions, the foregoing method embodiments are stated as a series of action combinations. However, a person skilled in the art is to know that this application is not limited to the sequence of the described actions because according to this application, some steps may use another sequence or may be simultaneously performed. In addition, it is to be understood by a person skilled in the art that the embodiments described in the specification are all exemplary embodiments and the related actions and modules are not mandatory to this application.

According to the foregoing descriptions of implementations, a person skilled in the art may clearly learn that the method according to the foregoing embodiments may be implemented by using software and a necessary general hardware platform, or certainly may be implemented by using hardware. However, in most cases, the former is a better implementation. Based on such an understanding, the technical solutions in this application essentially or the part contributing to the related art may be implemented in the form of a software product. The computer software product is stored in a storage medium (such as a ROM/RAM, a magnetic disk, or an optical disc), and includes several instructions for instructing a terminal device (which may be a mobile phone, a computer, a server, a network device, and the like) to perform the method described in the embodiments of this application.

Figure 5:
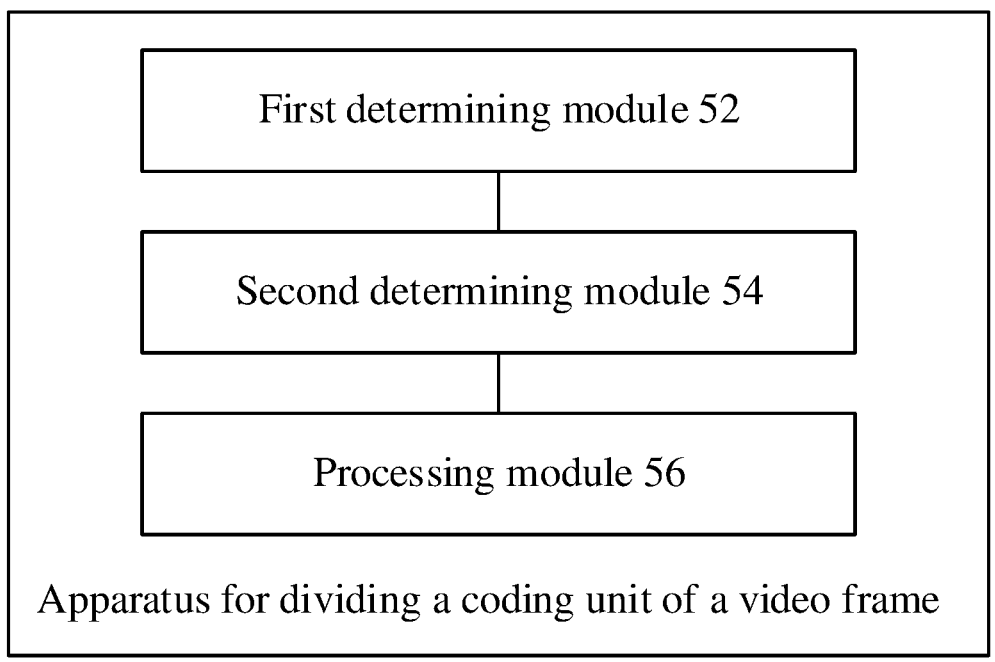
FIG. 5 is a schematic diagram of an optional apparatus for dividing a coding unit of a video frame according to an embodiment of this application.

According to another aspect of the embodiments of this application, an apparatus for dividing a coding unit of a video frame for implementing the method for dividing a coding unit of a video frame is further provided. As shown in FIG. 5, the apparatus includes:

(1) a first determining module 52, configured to determine, according to a frame type and a coding unit type that have a correspondence, a target coding unit type corresponding to a target frame type to which a target frame belongs, the target coding unit type being used for indicating a division depth for dividing the target frame;

(2) a second determining module 54, configured to determine, according to coding unit information of a target coding unit in a case that the target coding unit belonging to the target coding unit type in the target frame is divided, whether the target coding unit meets a target condition, to obtain a target result; and (3) a processing module 56, configured to perform a division operation corresponding to the target result on the target coding unit.

In an optional solution, the processing module includes:
a first processing unit, configured to stop division of the target coding unit in a case that the target result is used for indicating that the target coding unit meets the target condition; and/or a second processing unit, configured to divide the target coding unit in a case that the target result is used for indicating that the target coding unit does not meet the target condition.

Optionally, in this embodiment, in a case that the target coding unit meets the target condition, a division operation corresponding to the target result may include, but is not limited to, stopping division of the target coding unit.

Optionally, in this embodiment, in a case that the target coding unit does not meet the target condition, a division operation corresponding to the target result may include, but is not limited to, continuing to divide the target coding unit.

In an optional solution, the foregoing apparatus further includes:

(1) a first obtaining module, configured to obtain the frame type, the frame type being obtained through division according to a reference relationship between frames in a frame coding process;

(2) a second obtaining module, configured to obtain the coding unit type corresponding to the frame type, the coding unit type being used for indicating that a division depth is a first depth value when a frame belonging to the frame type is divided, or the coding unit type being used for indicating a depth relationship between a second depth value and a target depth value when a frame belonging to the frame type is divided; and (3) a storage module, configured to store the frame type and the coding unit type that have a correspondence.

Optionally, in this embodiment, the coding unit type may be used for indicating one or more specific depth values (for example, 3, 2, 1, and 0), or may be used for indicating depth relationships (for example, lower than the highest depth value, lower than the highest depth value and higher than the lowest depth value, and only lower than the highest depth value).

In an optional implementation, for example, there are 4 types of depth values, which are respectively: 3, 2, 1, and 0. When the coding unit type is used for indicating that a division depth is a first depth value when a frame belonging to the frame type is divided, the frame type and the coding unit type that have a correspondence may be shown in Table 1.

In an optional solution, the first obtaining module is configured to:

determine the frame type, the frame type including: a first frame type, a second frame type, a third frame type, and a fourth frame type, where a frame of the first frame type is a frame coded without reference to any other frame; a frame of the second frame type is a frame coded with reference to a frame of the first frame type; a frame of the third frame type is a frame coded with reference to a frame of the first frame type and a frame of the second frame type in the frame coding process; and a frame of the fourth frame type is a frame coded with reference to a frame of the first frame type and a frame of the third frame type, or coded with reference to a frame of the second frame type and a frame of the third frame type.

Optionally, in this embodiment, frames of the first frame type, the second frame type, the third frame type, and the fourth frame type may have, but not limited to, the following reference relationships: for a frame of the second frame type, reference is made to a frame of the first frame type; for a frame of the third frame type, reference is made to a frame of the first frame type and a frame of the second frame type; and for a frame of the fourth frame type, reference is made to a frame of the first frame type and a frame of the third frame type, or for a frame of the fourth frame type, reference is made to a frame of the second frame type and a frame of the third frame type.

For example, the frame of the first frame type may be an I frame, the frame of the second frame type may be a P frame, the frame of the third frame type may be a B frame, and the frame of the fourth frame type may be a b frame.

In an optional solution, the second obtaining module includes:

a first determining unit, configured to determine that the first frame type does not have a coding unit type;

a second determining unit, configured to determine that a coding unit type corresponding to the second frame type is a first coding unit type, coding units belonging to the first coding unit type including: 16×16 coding units;

a third determining unit, configured to determine that a coding unit type corresponding to the third frame type is a second coding unit type, coding units belonging to the second coding unit type including: 16×16 coding units and 32×32 coding units; and a fourth determining unit, configured to determine that a coding unit type corresponding to the fourth frame type is a third coding unit type, coding units belonging to the third coding unit type including: 16×16 coding units, 32×32 coding units, and 64×64 coding units.

In an optional solution, the coding unit type may be further used for indicating that a division depth is a first depth value when a frame belonging to the frame type is divided. In this case, the second obtaining module includes:

(1) a fifth determining unit, configured to determine that a coding unit type corresponding to the first frame type is a first coding unit type, where a first depth value indicated by the first coding unit type is a first target value, the first target value is a depth value lower than the lowest depth value or higher than the highest depth value, the highest depth value is a depth value of the smallest coding unit into which a frame may be divided, and the lowest depth value is a depth value of the frame;

(2) a sixth determining unit, configured to determine that a coding unit type corresponding to the second frame type is a second coding unit type, where a first depth value indicated by the second coding unit type is a second target value, the second target value is a depth value only lower than the highest depth value, and the highest depth value is a depth value of the smallest coding unit into which a frame may be divided;

(3) a seventh determining unit, configured to determine that a coding unit type corresponding to the third frame type is a third coding unit type, where a first depth value indicated by the third coding unit type is a third target value, the third target value is a depth value lower than the highest depth value and higher than the lowest depth value, the highest depth value is a depth value of the smallest coding unit into which a frame may be divided, and the lowest depth value is a depth value of the frame; and (4) an eighth determining unit, configured to determine that a coding unit type corresponding to the fourth frame type is a fourth coding unit type, where a first depth value indicated by the fourth coding unit type is a fourth target value, the fourth target value is a depth value lower than the highest depth value, and the highest depth value is a depth value of the smallest coding unit into which a frame may be divided.

In an optional solution, the second determining module includes:

(1) a ninth determining unit, configured to determine a coding unit according with the division depth indicated by the target coding unit type in the target frame as the target coding unit;

(2) an obtaining unit, configured to obtain the coding unit information of the target coding unit in a case that the target coding unit is divided; and (3) a tenth determining unit, configured to determine, according to the coding unit information, whether the target coding unit meets the target condition.

In an optional solution, the obtaining unit is configured to: obtain an optimal mode of the target coding unit and a rate-distortion cost of the optimal mode.

The tenth determining unit is configured to: determine, in a case that the optimal mode is the skip mode and the rate-distortion cost falls within a target threshold range, that the target coding unit meets the target condition; and/or determine, in a case that the optimal mode is not the skip mode or the rate-distortion cost does not fall within the target threshold range, that the target coding unit does not meet the target condition.

For an application environment of this embodiment of this application, reference may be made to, but not limited to the application environment of the foregoing embodiment. This is not described in detail in this embodiment. This embodiment of this application provides an optional specific application example for implementing the foregoing method for dividing a coding unit of a video frame.

Figure 6:
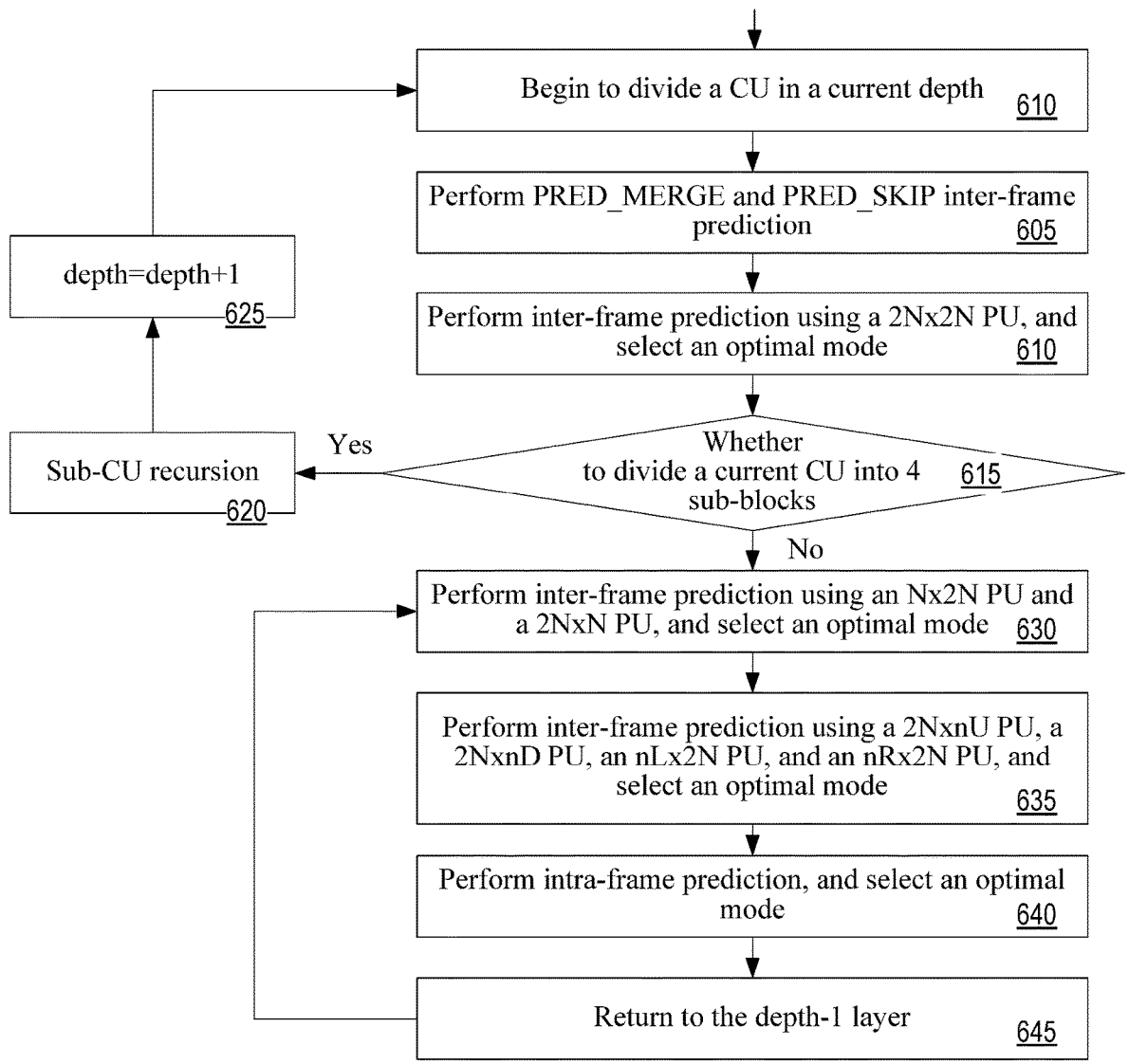
FIG. 6 is a schematic diagram of an application scenario of an optional method for dividing a coding unit of a video frame according to an embodiment of this application.

In an optional embodiment, the method for dividing a coding unit of a video frame may be applied to, but not limited to, a scenario of coding a frame shown in FIG. 6. Fully accurate prediction in video coding is impossible. Once an error occurs in the prediction, a compression ratio loss is necessarily caused, and because errors are accumulated, the errors may be gradually expanded. Error accumulation of CU depths is mainly caused by two aspects. One aspect is a frame type of a current frame. Error accumulation is diffused within an I-frame period. For a P frame, reference is made to an I frame; for a B frame, reference is made to the P frame or the I frame; for a b frame, reference is made to the I frame, the P frame, or the B frame; the b frame is not used as a reference frame. Weights of the 4 frame types are ranked in descending order as follows: I frame>P frame>B frame>b frame. In addition, the error accumulation of the CU depths is related to the size of a CU. Once an error occurs during division from a largest 64×64 CU to 32×32 CUs, subsequent division from 4 32×32 CUs to 16×16 CUs and division from 16 16×16 CUs to 8×8 CUs are not performed. Similarly, once an error occurs during division from a 32×32 CU to 16×16 CUs, subsequent division from 4 16×16 CUs to 8×8 CUs is not performed. However, once an error occurs during division from a 16×16 CU to 8×8 CUs, only the division from a 16×16 CU to 8×8 CUs is affected. Therefore, influencing weights of CUs with different sizes are ranked in descending order as follows: CU64×64>CU32×32>CU16×16. In this scenario, for a process of dividing a coding unit of a video frame, due to the foregoing two characteristics, CUs with different sizes and a frame type of a current frame are separately processed.

For the I frame, because once an error occurs in the I frame, all frames behind the I frame are affected, quick determining of CU depths are not performed on CU blocks in the I frame. For the P frame, because a weight of the P frame is second only to that of the I frame, and there are a plurality of impacts, quick depth determination is performed only on a layer of division from CU16×16 to CU8×8 in the P frame. For the B frame, because an influencing range of the B frame is only within a P-frame period, quick depth determination may be performed on two layers of division from CU32×32 to CU16×16 and division from CU16×16 to CU8×8. For the b frame, because other frames are not affected by an error, quick depth determination is performed on all layers.

Optionally, in this scenario, a quick depth determination process is performed according to whether a CU has a residual, a quantity of surrounding CTUs with the same depth and no residual block, an average rate-distortion cost of the CTUs, and a rate-distortion cost of a current CU in an optimal mode. In addition, whether a current CU is further divided is determined according to whether the current CU is in a skip mode, a quantity of CUs that have the same depth and that are in the skip mode in surrounding CTUs, an average rate-distortion cost of the CTUs, and a rate-distortion cost of the current CU in an optimal mode.

A frame is sent to an encoder. A predicted value is obtained by performing intra-frame prediction or inter-frame prediction on the frame, and the predicted value is subtracted from input data, to obtain a residual. Then, a residual coefficient is obtained by performing discrete cosine transform (DCT) and quantization, and the obtained residual coefficient is sent to an entropy coding module to output a code stream. In addition, after the residual coefficient is inversely quantized and inversely transformed, a residual value of a reconstructed image is obtained, and the reconstructed image is obtained by adding the residual value and the predicted intra-frame or inter-frame value. The reconstructed image enters a reference frame queue after in-loop filtering, and is used as a reference image of the next frame, so that coding is performed backward frame by frame. When intra-frame prediction or inter-frame prediction is performed, a recursive operation is performed downward layer by layer, and in each layer, an LCU is first divided according to a quad-tree. For each CTU, a recursive process of a total of three levels, namely, division from CU64×64 to CU32×32, division from CU32×32 to CU16×16, and division from CU16×16 to CU8×8, is performed, and then layer-by-layer comparison is performed to select an optimal CU division mode.

In this scenario, information about CTUs around a current CU, whether a current frame is used as a reference frame or a weight of which the current frame is used as the reference frame, and calculated optimal information of the current CU are used for predicting division of the current coding unit. For CUs with different sizes, adopted strategies are different, thereby quickly selecting a coding unit depth, so that coding complexity is reduced, and a coding speed is improved.

In this scenario, as shown in FIG. 6, when a frame is coded, sub-CU recursion (at 620) is sometimes performed in advance after prediction using a 2N×2N predict unit (PU) (at 610). A process of quickly determining a coding unit depth is performed in a step of determining whether a current CU is divided into 4 sub-blocks (at 615). That is, before whether a current CU is further divided is determined, PU merging (at 605), skip computing, and prediction using a 2N×2N PU are performed. The optimal mode related in the following is an optimal mode selected after inter prediction using a 2N×2N PU is performed.

When it's determined to divide a current CU into 4 sub-blocks (at 615), a sub-CU recursion is performed (at 620), the depth=depth+1 (at 625), and beginning to divide a CU in the current depth is performed (at 610).

When it's determined not to divide a current CU into 4 sub-blocks (at 615), inter-frame prediction using an N×2N PU and a 2N×N PU is performed, and an optimal mode is selected (at 630). Inter-frame prediction is performed using a 2N×nU PU, a 2N×nD PU, an nL×2N PU, and an nR×2N PU, and an optimal mode is selected (at 635). Intra-frame prediction is performed, and an optimal mode is selected (at 640). Then, it is returned to the depth−1 layer (at 645) to begin 630.

In the process of quickly determining a coding unit depth, for an I frame, quick depth determination is not performed, and original division from CU64×64 to CU32×32, division from CU32×32 to CU16×16, and division from CU16×16 to CU8×8 are adopted.

For a P frame, quick depth determination is performed only during division from CU16×16 to CU8×8. The determining process includes the following steps:

Step 1. Obtain a quantity of available CTUs in adjacent locations (a left side, an upper side, an upper left corner, and an upper right corner) of a current CTU, a quantity of CUs that are in a skip mode and that have the same CU depth in adjacent CTUs, and an average of rate-distortion costs of the CUs through statistics, respectively denoted as ctu_validnum_skip_adjacent, samecudepth_num_skip_adjacent, and samecudepth_avgcost_skip_adjacent.

Step 2. Obtain a quantity of processed CUs in the current CTU that are in the skip mode and that have the same depth and an average of rate-distortion costs of the CUs through statistics, respectively denoted as samecudepth_num_skip_curr and samecudepth_avgcost_skip_curr.

Step 3. If both of the following conditions are met, stop dividing the current CU into 4 sub-blocks, and if not, divide the current CU into 4 sub-blocks.

Condition 1. An optimal mode of the current CU is a skip mode.

Condition 2. A rate-distortion cost of the optimal mode of the current CU is denoted as bestcost, an initial check is false, and check becomes true after comparison. The comparison process is as follows:

```
check=false; //dividing a current CU into 4 sub-blocks is required by default
if(ctu_validnum_skip_adjacent>0) //adjacent CTUs are available
{
    //if there is no CU meeting a target condition in the current CTU, only an
average rate-distortion cost of CUs in the adjacent CTUs is obtained
    avgcost=samecudepth_avgcost_skip_adjacent;
```

```
    if(samecudepth_num_skip_curr>0) //the current CTU includes CUs with the
same CU depth and in a skip mode, and an average rate-distortion cost is obtained by performing
weighted summation on rate-distortion costs of CUs that have the same depth in the adjacent
CTUs and rate-distortion costs of the processed CUs in the current CTU that have the same depth
      {
      avgcost=(9*samecudepth_avgcost_skip_curr+samecudepth_avgcost_skip_adjace
nt)/16;
      }
      if(bestcost<=avgcost&&samecudepth_num_skip_adjacent>3.5*ctu_validnum_ski
p_adjacent)
      {
        check=true;
      }
    }
    else //all the adjacent CTUs are not available
    {
if(bestcost<=samecudepth_avgcost_skip_curr&&samecudepth_num_skip_curr>3.5) //compared
with an average of the rate-distortion costs of the processed CUs in the current CTU that have
the same depth and a quantity of the processed CUs
      {
        check=true;
      }
    }
  }
```

For the B frame, because an influencing range of the B frame is only within a P-frame period, quick depth determination may be performed during division from CU32×32 to CU16×16 and division from CU16×16 to CU8×8. A method used when the quick depth determination is performed during the division from CU32×32 to CU16×16 is the same as the manner used in the P frame. A difference lies in that a coefficient is changed from 3.5 to 1.5. Details are not described herein.

A method used when the quick depth determination is performed during the division from CU16×16 to CU8×8 is similar to the method used when the quick depth determination is performed during the division from CU32×32 to CU16×16. A difference lies in that in the information obtained through statistics, a quantized residual coefficient needs to be 0. The determining process includes the following steps:

Step 1. Obtain a quantity of available CTUs in adjacent locations (a left side, an upper side, an upper left corner, and an upper right corner) of a current CTU, a quantity of CUs of which residual coefficients obtained after quantization are 0 and that have the same depth in adjacent CTUs, and an average of rate-distortion costs of the CUs through statistics, respectively denoted as ctu_validnum_cbf_adjacent, samecudepth_num_cbf_adjacent, and samecudepth_avgcost_cbf_adjacent.

Step 2. Obtain a quantity of processed CUs of which residual coefficients obtained after quantization are 0 and that have the same depth in the current CTU and an average of rate-distortion costs of the CUs through statistics, respectively denoted as samecudepth_num_cbf_curr, and samecudepth_avgcost_cbf_curr.

Step 3. If both of the following conditions are met, stop dividing the current CU into 4 sub-blocks, and if not, divide the current CU into 4 sub-blocks.

Condition 1. An optimal mode of the current CU is a skip mode.

Condition 2. A rate-distortion cost of the optimal mode of the current CU is denoted as bestcost, an initial check is false, and check becomes true after comparison. The comparison process is as follows:

```
    check=false; //dividing a current CU into 4 sub-blocks is required by default
    if(ctu_validnum_cbf_adjacent>0) //adjacent CTUs are available
    {
      //if there is no CU meeting a target condition in a current CTU, only an average
rate-distortion cost of CUs in the adjacent CTUs is obtained
      avgcost=samecudepth_avgcost_cbf_adjacent;
      if(samecudepth_num_cbf_curr >0) //the current CTU includes CUs of which
residual coefficients obtained after quantization are 0 and that have the same depth, and an
average rate-distortion cost is obtained by performing weighted summation on rate-distortion
costs of CUs that have the same depth in the adjacent CTUs and rate-distortion costs of the
processed CUs in the current CTU that have the same depth
      {
      avgcost=(9*samecudepth_avgcost_cbf_curr+samecudepth_avgcost_cbf_adjacent)
/16;
      }
      if(bestcost<=avgcost&&samecudepth_num_cbf_adjacent>3.5*ctu_validnum_cbf
_adjacent)
      {
        check=true;
      }
    }
```

```
    else //all the adjacent CTUs are not available
    {
if(bestcost<=samecudepth_avgcost_cbf_curr&&samecudepth_num_cbf_curr>3.5) //compared
with an average of the rate-distortion costs of the processed CUs in the current CTU that have
the same depth and a quantity of the processed CUs
    {
      check=true;
    }
    }
```

If a CU is in the skip mode, a quantized residual coefficient of the CU is certainly 0. However, a quantized residual coefficient of 0 does not indicates a skip mode.

For the b frame, because the b frame is not used as a reference frame, other frames are not affected by loss of the b frame. Therefore, a process of quickly determining a coding unit depth is performed on all layers.

A process of performing quick depth determination during division from CU64×64 to CU32×32 (which is determined by the skip mode, and is limited to a quantity of CUs) includes the following steps:

Step 1. Obtain a quantity of available CTUs in adjacent locations (a left side, an upper side, an upper left corner, and an upper right corner) of a current CTU, a quantity of CUs in adjacent CTUs that are in a skip mode and that have the same CU depth, and an average of rate-distortion costs of the CUs through statistics, respectively denoted as ctu_validnum_skip_adjacent, samecudepth_num_skip_adjacent, and samecudepth_avgcost_skip_adjacent.

Step 2. If both of the following conditions are met, stop dividing the current CU into 4 sub-blocks, and if not, divide the current CU into 4 sub-blocks.

Condition 1. An optimal mode of the current CU is a skip mode.

Condition 2. A rate-distortion cost of the optimal mode of the current CU is denoted as bestcost, an initial check is false, and check becomes true after comparison. The comparison process is as follows:

A process of performing quick depth determination during division from CU32×32 to CU16×16 (which is determined by the skip mode, but is not limited to a quantity of CUs) includes the following steps:

Step 1. Obtain a quantity of available CTUs in adjacent locations (a left side, an upper side, an upper left corner, and an upper right corner) of a current CTU, a quantity of CUs in adjacent CTUs that are in a skip mode and that have the same CU depth, and an average of rate-distortion costs of the CUs through statistics, respectively denoted as ctu_validnum_skip_adjacent, samecudepth_num_skip_adjacent, and samecudepth_avgcost_skip_adjacent.

Step 2. Obtain a quantity of processed CUs in the current CTU that are in the skip mode and that have the same depth and an average of rate-distortion costs of the CUs through statistics, respectively denoted as samecudepth_num_skip_curr, samecudepth_avgcost_skip_curr.

Step 3. If both of the following conditions are met, stop dividing the current CU into 4 sub-blocks, and if not, divide the current CU into 4 sub-blocks.

Condition 1. An optimal mode of the current CU is a skip mode.

Condition 2. A rate-distortion cost of the optimal mode of the current CU is denoted as bestcost, an initial check is false, and check becomes true after comparison. The comparison process is as follows:

```
    check=false; //dividing a current CU into 4 sub-blocks is required by default
    if(ctu_validnum_skip_adjacent>0&&bestcost<=samecudepth_avgcost_skip_adjac
ent&&samecudepth_num_skip_adjacent>0.35*ctu_validnum_skip_adjacent)//
    {
      check=true;
    }
    }
```

```
check=false; //dividing a current CU into 4 sub-blocks is required by default
if(ctu_validnum_skip_adjacent>0) //adjacent CTUs are available
{
    //if there is no CU meeting a target condition in a current CTU, an average rate-
distortion cost of CUs in the adjacent CTUs is directly obtained
    avgcost=samecudepth_avgcost_skip_adjacent;
    if(samecudepth_num_skip_curr>0) //the current CTU includes CUs with the
same CU depth and in a skip mode, and an average rate-distortion cost is obtained by perform-
ing
weighted summation on rate-distortion costs of CUs that have the same depth in the adjacent
CTUs and rate-distortion costs of the processed CUs in the current CTU that have the same
depth.
    {
    avgcost=(9*samecudepth_avgcost_skip_curr+samecudepth_avgcost_skip_adjace
nt)/16;
    }
    if(bestcost<=avgcost)
    {
      check=true;
    }
}
else //all the adjacent CTUs are not available
{
    if(bestcost <= samecudepth_avgcost_skip_curr) //compared with an average of
the rate-distortion costs of the processed CUs in the current CTU that have the same depth and a
quantity of the processed CUs
    {
      check=true;
    }
}
```

A process of performing quick depth determination during division from CU16×16 to CU8×8 (which is determined by a quantized residual coefficient, but is not limited to a quantity of CUs) includes the following steps:

The process is similar to the division from CU16×16 to CU8×8 in the B frame, but is not limited to a quantity of CUs, that is, Step 1. Obtain a quantity of available CTUs in adjacent locations (a left side, an upper side, an upper left corner, and an upper right corner) of a current CTU, a quantity of CUs of which residual coefficients obtained after quantization are 0 and that have the same depth in the current CTU, and an average of rate-distortion costs of the CUs through statistics, respectively denoted as ctu_validnum_cbf_adjacent, samecudepth_num_cbf_adjacent, and samecudepth_avgcost_cbf_adjacent.

Step 2. Obtain a quantity of processed CUs of which residual coefficients obtained after quantization are 0 and that have the same depth in the current CTU and an average of rate-distortion costs of the CUs through statistics, respectively denoted as samecudepth_num_cbf_curr, and samecudepth_avgcost_cbf_curr.

Step 3. If both of the following conditions are met, stop dividing the current CU into 4 sub-blocks, and if not, divide the current CU into 4 sub-blocks.

Condition 1. An optimal mode of the current CU is a skip mode.

Condition 2. A rate-distortion cost of the optimal mode of the current CU is denoted as bestcost, an initial check is false, and check becomes true after comparison. The comparison process is as follows:

```
check=false; //dividing a current CU into 4 sub-blocks is required by default
if(ctu_validnum_cbf_adjacent>0) //adjacent CTUs are available
{
    //if there is no CU meeting a target condition in a current CTU, only an average
rate-distortion cost of CUs in the adjacent CTUs is obtained
    avgcost=samecudepth_avgcost_cbf_adjacent;
    if(samecudepth_num_cbf_curr >0) //the current CTU includes CUs of which
residual coefficients obtained after quantization are 0 and that have the same depth, and an
average rate-distortion cost is obtained by performing weighted summation on rate-distortion
costs of CUs that have the same depth in the adjacent CTUs and rate-distortion costs of the
processed CUs in the current CTU that have the same depth
    {
    avgcost=(9*samecudepth_avgcost_cbf_curr+samecudepth_avgcost_cbf_adjacent)
/16;
    }
    if(bestcost<=avgcost)
    {
      check=true;
    }
}
```

```
    else //all the adjacent CTUs are not available
    {
        if(bestcost <= samecudepth_avgcost_skip_curr) //compared with an average of
the rate-distortion costs of the processed CUs in the current CTU that have the same depth and a
quantity of the processed CUs
        {
            check=true;
        }
    }
}
```

By using the manner provided in this scenario, a coding speed is greatly improved. If it is learned that a 32×32 CU is not divided into 4 sub-blocks, various types of calculation using PUs does not need to be performed on 4 sub-CUs (having 16×16 sizes) of the corresponding CU and 4 sub-CUs (having 8×8 sizes) included in each 16×16 CU, and this may greatly reduce a calculation amount.

Figure 7:
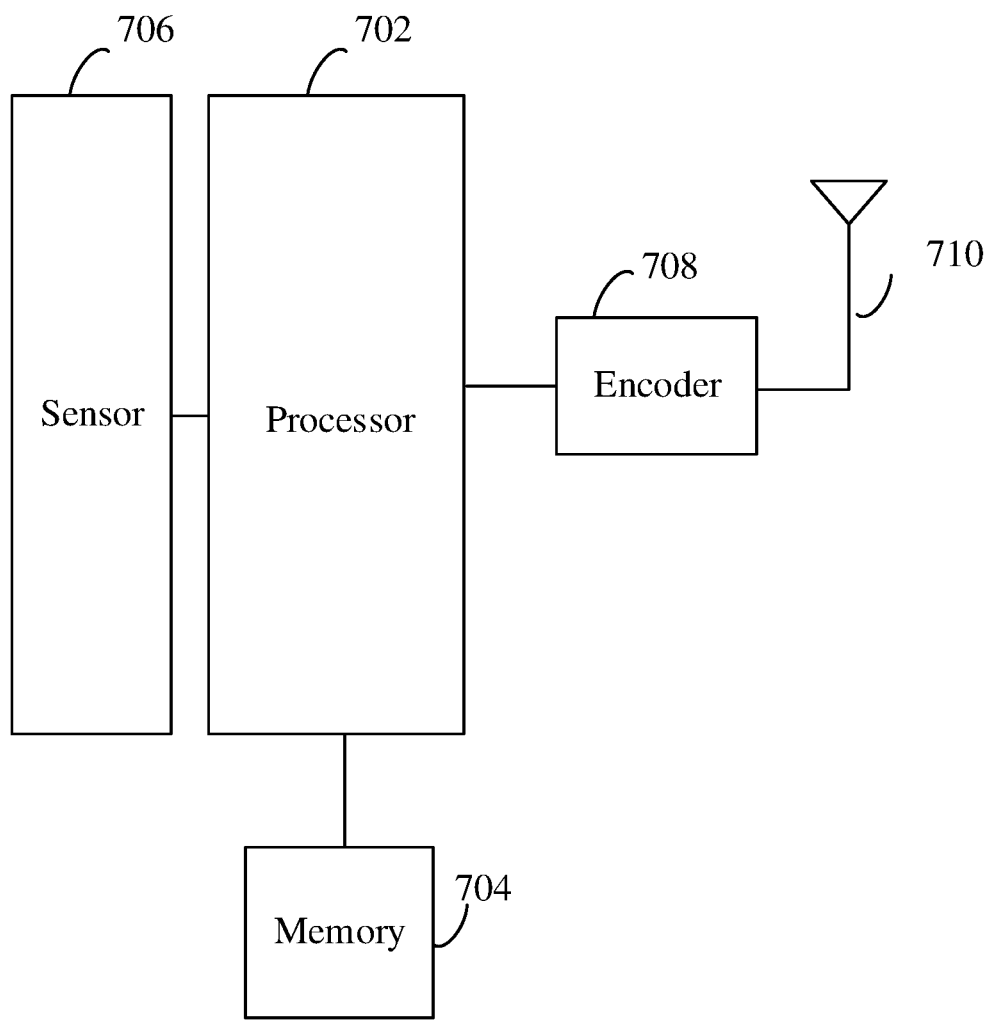
FIG. 7 is a schematic diagram of an optional electronic device according to an embodiment of this application.

According to still another aspect of the embodiments of this application, an electronic device configured to implement the foregoing method for dividing a coding unit of a video frame is further provided. As shown in FIG. 7, the electronic device includes one or more processors 702 (only one processor is shown in the figure), a memory 704, a sensor 706, an encoder 708, and a transmission apparatus 710. The memory stores a computer program, and the processor is configured to perform steps in any one of the foregoing method embodiments by using the computer program.

Optionally, in this embodiment, the electronic device may be located in at least one of a plurality of network devices in a computer network.

Optionally, in this embodiment, the processor may be configured to perform, by using the computer program, the following steps:

S1. Determine, according to a frame type and a coding unit type that have a correspondence, a target coding unit type corresponding to a target frame type to which a target frame belongs, the target coding unit type being used for indicating a division depth for dividing the target frame.

S2. Determine, according to coding unit information of a target coding unit in a case that the target coding unit belonging to the target coding unit type in the target frame is divided, whether the target coding unit meets a target condition.

S3. Perform a division operation corresponding to the target result on the target coding unit.

Optionally, a person of ordinary skill in the art may understand that, the structure shown in FIG. 7 is only illustrative. The electronic device may be a terminal device such as a smartphone (for example, an Android mobile phone or an iOS mobile phone), a tablet computer, a palmtop computer, a mobile Internet device (MID), or a PAD. FIG. 7 does not constitute a limitation on a structure of the foregoing electronic device. For example, the electronic device may alternatively include more or fewer components (such as a network interface and a display apparatus) than those shown in FIG. 7, or has a configuration different from that shown in FIG. 7.

The memory 702 may be configured to store a software program and a module, for example, program instructions/modules corresponding to the method and apparatus for dividing a coding unit of a video frame in the embodiments of this application. The processor 704 runs the software program and module stored in the memory 702, to implement various functional applications and data processing, that is, implement the foregoing method for dividing a coding unit of a video frame. The memory 702 may include a high-speed random access memory, and may further include a non-volatile memory, for example, one or more magnetic storage apparatuses, a flash memory, or another non-volatile solid-state memory. In some embodiments, the memory 702 may further include memories remotely disposed relative to the processor 704, and these remote memories may be connected to a terminal by using a network. Examples of the foregoing network include, but are not limited to, an Internet, an intranet, a local area network, a mobile communication network, and a combination thereof.

The transmission apparatus 710 is configured to receive or send data by using a network. Specific instances of the foregoing network may include a wired network and a wireless network. In an example, the transmission apparatus 710 includes a network interface controller (NIC), which may be connected to another network device and a router by using a cable, so as to communicate with the Internet or a local area network. In an example, the transmission apparatus 710 is a radio frequency (RF) module, which is configured to communicate with the Internet in a wireless manner.

Specifically, the memory 702 is configured to store an application program.

An embodiment of this application further provides a storage medium, storing a computer program, the computer program being used for performing steps in any one of the foregoing method embodiments when run.

Optionally, in this embodiment, the storage medium may be configured to store a computer program for performing the following steps:

S1. Determine, according to a frame type and a coding unit type that have a correspondence, a target coding unit type corresponding to a target frame type to which a target frame belongs, the target coding unit type being used for indicating a division depth for dividing the target frame.

S2. Determine, according to coding unit information of a target coding unit in a case that the target coding unit belonging to the target coding unit type in the target frame is divided, whether the target coding unit meets a target condition, to obtain a target result.

S3. Perform a division operation corresponding to the target result on the target coding unit.

Optionally, the storage medium is further configured to store a computer program for performing steps included in the method in the foregoing embodiments. Details are not described again in this embodiment.

An embodiment of this application further provides a computer program product including an instruction, the computer program product, when run on a computer, causing the computer to perform the method for dividing a coding unit of a video frame according to this application.

Optionally, in this embodiment, a person of ordinary skill in the art may understand that all or part of the steps of the methods in the embodiments may be implemented by a program by instructing hardware relevant to a terminal device. The program may be stored in a computer-readable storage medium, and the storage medium may include a flash drive, a read-only memory (ROM), a random access memory (RAM), a magnetic disk, and an optical disk.

The sequence numbers of the foregoing embodiments of this application are merely for description purpose, and do not indicate the preference among the embodiments.

When the integrated unit in the foregoing embodiments is implemented in a form of a software functional unit and sold or used as an independent product, the integrated unit may be stored in the foregoing computer-readable storage medium. Based on such an understanding, the technical solutions of this application essentially, or the part contributing to the related art, or all or some of the technical solutions may be implemented in a form of a software product. The computer software product is stored in a storage medium and includes several instructions for instructing one or more computer devices (which may be a personal computer, a server, a network device, and the like) to perform all or some of the steps of the methods in the embodiments of this application.

In the foregoing embodiments of this application, descriptions of the embodiments have different emphases. As for parts that are not described in detail in one embodiment, reference may be made to the relevant descriptions of the other embodiments.

In the several embodiments provided in this application, it is to be understood that the disclosed client may be implemented in other manners. The described apparatus embodiment is merely exemplary. For example, the unit division is merely logical function division and may be another division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the units or modules may be implemented in electronic or other forms.

The units described as separate parts may or may not be physically separate. Parts displayed as units may or may not be physical units, and may be located in one position, or may be distributed on a plurality of network units. Some of or all of the units may be selected according to actual needs to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software function unit.

The foregoing descriptions are merely exemplary implementations of this application. A person of ordinary skill in the art may further make several improvements and refinements without departing from the principle of this application, and the improvements and refinements shall fall within the protection scope of this application.

What is claimed is:

1. A method for dividing a current coding unit of a video frame by a device comprising a memory storing instructions and a processor in communication with the memory for executing the instructions, the method comprising:

determining a frame type of the video frame as one of at least a P frame type, a B frame type, or a b frame type, wherein the P frame type is for a frame coded with reference to a base frame type coded without reference to any other frame, the B frame type is for a frame coded with reference to a frame of the P frame type and a frame of the base frame type, and the b frame type is for a frame coded with reference to a frame of the base frame type and a frame of the B frame type, or coded with reference to a frame of the P frame type and a frame of the B frame type, and a frame of the b frame type is not used as a reference frame;

determining a set of target coding unit levels as including, among hierarchical coding unit levels of 64×64, 32×32, and 16×16:

16×16 coding unit level only when the video frame is P frame type;

16×16 coding unit level and 32×32 coding unit level when the video frame is B frame type; or 16×16 coding unit level, 32×32 coding unit level, and 64×64 coding unit level when the video frame is b frame type; and when a coding unit level of the current coding unit is among the set of target coding unit levels corresponding to the video frame's frame type, determining whether to further divide the current coding unit into lower level coding units during a hierarchical division of the video frame according to whether the current coding unit meets a target condition.

2. The method according to claim 1, wherein determining whether to further divide the current coding unit into lower level coding units during the hierarchical division of the video frame comprises:

when the target condition is met, stopping, by the device, division of the current coding unit; and when the target condition is not met, dividing, by the device, the current coding unit into next lower level coding unit.

3. The method according to claim 1, further comprising:

determining the current coding unit is among the set of target coding unit levels;

obtaining a coding unit information of the current coding unit; and determining, by the device according to the coding unit information, whether the current coding unit meets the target condition.

4. The method according to claim 3, wherein:

obtaining the coding unit information of the current coding unit comprises:

obtaining, by the device, an optimal mode of the current coding unit and a rate-distortion cost of the optimal mode; and determining, according to the coding unit information, whether the current coding unit meets the target condition comprises:

in response to the optimal mode being a skip mode and the rate-distortion cost falling within a target threshold range, determining, by the device, that the current coding unit meets the target condition, and in response to the optimal mode not being the skip mode or the rate-distortion cost not falling within the target threshold range, determining, by the device, that the current coding unit does not meet the target condition.

5. An apparatus for dividing a current coding unit of a video frame, the apparatus comprising:
a memory storing instructions; and
a processor in communication with the memory, wherein, when the processor executes the instructions, the processor is configured to cause the apparatus to:
determine a frame type of the video frame as one of at least a P frame type, a B frame type, or a b frame type, wherein the P frame type is for a frame coded with reference to a base frame type coded without reference to any other frame, the B frame type is for a frame coded with reference to a frame of the P frame type and a frame of the base frame type, and the b frame type is for a frame coded with reference to a frame of the base frame type and a frame of the B frame type, or coded with reference to a frame of the P frame type and a frame of the B frame type, and a frame of the b frame type is not used as a reference frame;
determine a set of target coding unit levels as including, among hierarchical coding unit levels of 64×64, 32×32, and 16×16:
16×16 coding unit level only when the video frame is P frame type;
16×16 coding unit level and 32×32 coding unit level when the video frame is B frame type; or
16×16 coding unit level, 32×32 coding unit level, and 64×64 coding unit level when the video frame is b frame type; and
when a coding unit level of the current coding unit is among the set of target coding unit levels corresponding to the video frame's frame type, determine whether to further divide the current coding unit into lower level coding units during a hierarchical division of the video frame according to whether the current coding unit meets a target condition.

6. The apparatus according to claim 5, wherein the processor is configured to cause the apparatus to:
when the target condition is met, stop division of the target coding unit; and
when the target condition is not met, divide the current coding unit into next lower level coding units.

7. The apparatus according to claim 5, wherein the processor is further configured to cause the apparatus to:
determine the current coding unit is among the set of target coding unit levels;
obtain a coding unit information of the current coding unit; and
determine, according to the coding unit information, whether the current coding unit meets the target condition.

8. The apparatus according to claim 7, wherein:
when the processor is configured to cause the apparatus to obtain the coding unit information of the current coding unit, the processor is configured to cause the apparatus to:
obtain an optimal mode of the current coding unit and a rate-distortion cost of the optimal mode; and
when the processor is configured to cause the apparatus to determine, according to the coding unit information, whether the current coding unit meets the target condition, the processor is configured to cause the apparatus to:
in response to the optimal mode being a skip mode and the rate-distortion cost falling within a target threshold range, determine that the current coding unit meets the target condition, and
in response to the optimal mode not being the skip mode or the rate-distortion cost not falling within the target threshold range, determine that the current coding unit does not meet the target condition.

9. A non-transitory computer readable storage medium storing computer readable instructions, wherein, the computer readable instructions, when executed by a processor, are configured to cause the processor to perform:
determining a frame type of a video frame as one of at least a P frame type, a B frame type, or a b frame type, wherein the P frame type is for a frame coded with reference to a base frame type coded without reference to any other frame, the B frame type is for a frame coded with reference to a frame of the P frame type and a frame of the base frame type, and the b frame type is for a frame coded with reference to a frame of the base frame type and a frame of the B frame type, or coded with reference to a frame of the P frame type and a frame of the B frame type, and a frame of the b frame type is not used as a reference frame;
determining a set of target coding unit levels as including, among hierarchical coding unit levels of 64×64, 32×32, and 16×16:
16×16 coding unit level only when the video frame is P frame type;
16×16 coding unit level and 32×32 coding unit level when the video frame is B frame type; or
16×16 coding unit level, 32×32 coding unit level, and 64×64 coding unit level when the video frame is b frame type; and
when a coding unit level of a current coding unit is among the set of target coding unit levels corresponding to the video frame's frame type, determining whether to further divide the current coding unit into lower level coding units during a hierarchical division of the video frame according to whether the current coding unit meets a target condition.

10. The non-transitory computer readable storage medium according to claim 9, wherein, when the computer readable instructions are configured to cause the processor to determine whether to further divide the current coding unit into lower level coding units, the computer readable instructions are configured to cause the processor to perform:
when the target condition is met, stopping division of the current coding unit; and
when the target condition is not met, dividing the current coding unit in next lower level coding units.

11. The non-transitory computer readable storage medium according to claim 9, wherein the computer readable instructions are further configured to cause the processor to perform:
determining the current coding unit is among the set of target coding unit levels;
obtaining a coding unit information of the current coding unit; and
determining, according to the coding unit information, whether the current coding unit meets the target condition.

12. The non-transitory computer readable storage medium according to claim 11, wherein:
obtaining the coding unit information of the current coding unit comprises:
obtaining an optimal mode of the current coding unit and a rate-distortion cost of the optimal mode; and
determining, according to the coding unit information, whether the current coding unit meets the target condition comprises:

in response to the optimal mode being a skip mode and the rate-distortion cost falling within a target threshold range, determining that the current coding unit meets the target condition, and in response to the optimal mode not being the skip mode or the rate-distortion cost not falling within the target threshold range, determining that the current coding unit does not meet the target condition.

13. The method according to claim 3, further comprising:
determining the current coding unit is not among the set of target coding unit levels; and
further dividing the current coding unit into lower level coding units whether or not the current coding unit meets the target condition.

14. The apparatus according to claim 7, wherein the processor is further configured to cause the apparatus to:
determine the current coding unit is not among the set of target coding unit levels; and
further divide the current coding unit into lower level coding units whether or not the current coding unit meets the target condition.

15. The non-transitory computer readable storage medium according to claim 11, wherein the computer readable instructions are further configured to cause the processor to perform:
determining the current coding unit is not among the set of target coding unit levels; and
further dividing the current coding unit into lower level coding units whether or not the current coding unit meets the target condition.

* * * * *